UNITED STATES PATENT OFFICE.

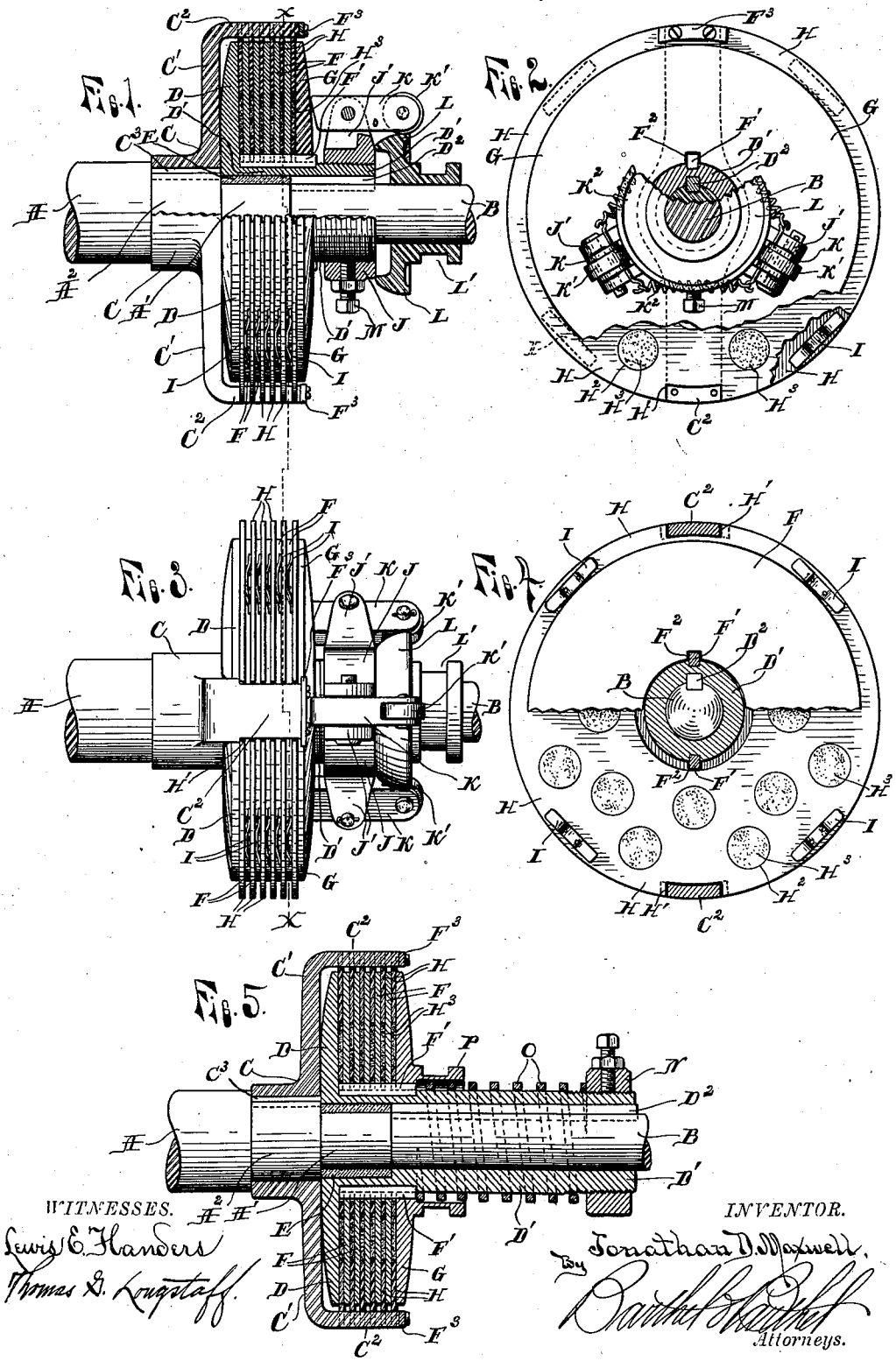

JONATHAN D. MAXWELL, OF DETROIT, MICHIGAN.

FRICTION-CLUTCH.

No. 810,783.	Specification of Letters Patent.	Patented Jan. 23, 1906.

Application filed July 25, 1904. Serial No. 217,925.

*To all whom it may concern:*

Be it known that I, JONATHAN D. MAXWELL, a citizen of the United States of America, residing at Detroit, in the county of Wayne and State of Michigan, have invented certain new and useful Improvements in Friction-Clutches, of which the following is a specification, reference being had therein to the accompanying drawings.

This invention relates to improvements in friction-clutches, and especially to clutches for coupling the abutting ends of two shafts; and its object is to provide a simple, compact, and efficient device having an extended area of frictional surface, which is formed with parts made of an abrasive or other suitable material to increase the friction.

It is also an object of the invention to provide means insuring the ready release of the clutch and to provide the advantages of the particular construction, arrangement, and combination of parts, all as more fully hereinafter described, and shown in the accompanying drawings, in which—

Figure 1 is a longitudinal section of a device embodying the invention and showing the same partially in side elevation; Fig. 2, an end elevation of the same with parts broken away to show the construction; Fig. 3, a plan view of Fig. 1. Fig. 4 is a section on the line $x\,x$ of Figs. 1 and 3, and Fig. 5 is a longitudinal section of a clutch embodying a modified form of shifting mechanism.

As shown in the drawings, A is the driving-shaft, which may be the shaft of the engine, and B is the driven shaft, to which motion is transmitted from the driving-shaft by the clutch. The two shafts are supported in line with each other with their ends abutting, and the driving-shaft is provided with a reduced end $A'$ of the same diameter as the driven shaft and a reduced portion $A^2$, adjacent thereto, to receive a yoke C, rigidly secured thereon by a key $C^3$ and consisting of a hub portion having a bore to fit the reduced portion of the shaft, and two outwardly and oppositely extending arms $C'$, having their outer ends $C^2$ extended longitudinally of the shaft.

A facing-disk D is provided with an extended integral axial hub or sleeve $D'$, which is bored out the length of the end $A'$ of the driving-shaft to loosely fit and turn upon a bushing-ring E, sleeved on said end, and is extended and bored to fit the ends of the driven shaft, to which it is rigidly secured by the key $D^2$. Loosely mounted on the hub $D'$ is a series of discous friction-plates F and a facing-disk G, and secured in suitable seats formed in the hub are the feathers $F'$, engaging notches $F^2$ on said plates and disk G, so that the same are attached to the hub to turn therewith, but free to move longitudinally thereof, the disk G being opposed to the disk D, with the plates between and all being of the same diameter and of lesser diameter than the distance between the ends $C^2$ of the yoke, which project across the edges of the disks and plates at opposite sides thereof.

Interposed between the disks D and G and their adjacent plates F and also between said plates is a series of driving discous plates H, each having an axial opening of such diameter that it may be slipped over the hub D outside the feathers $F'$ and turn freely thereon, said plates being of larger diameter than the plates F and each provided with a notch $H'$ at each side to receive and engage the longitudinally-extending ends $C^2$ of the yoke C, so that when said yoke is turned by the driving-shaft, to which it is secured, the arms will by their engagement with the notches $H'$ turn the plates H independently of the plates F. Strips $F^3$ are secured by screws to the outer ends of the arms $C^2$ to prevent the outer plate H from becoming disengaged from the arm when the clutch is released. In each of these driving-plates H is formed a series of openings or holes $H^2$, in each of which is secured a disk $H^3$, of abrasive or other suitable material, which will cause the plate H to adhere to or will create a greater friction between it and the adjacent plate F than a plain plate would create when the outer facing-disk G is moved longitudinally of the shaft to force the disks into contact with each other. Secured to the face of each of these plates H at its periphery is a series of flat metal springs I, which springs bear against the face of the adjacent disk H outside the interposed disk F and normally hold the disks separated.

To move the disks longitudinally of the shaft and bring them into frictional contact with each other, the end of the hub $D'$ outside the feathers $F'$ is screw-threaded to receive an internally-screw-threaded collar J, provided with outwardly-extending ears $J'$, between which the levers K are pivoted intermediate their ends, with one end of each bearing against the outer face of the facing-disk G and the other end provided with a roll K', adapted to be engaged by the cam-face of a cam member L, loosely mounted on the driven shaft to turn therewith and move longitudinally thereon, said cam member being provided with a groove L', by means of which an operating-lever (not shown) may be attached thereto to shift the same longitudinally. Springs K² are attached at their opposite ends to said lever adjacent to the rolls to hold the rolls against the cam, and a set-screw M is provided in the collar J to hold said collar in any position to which it may be turned, said collar being adjusted toward and from the disk G to cause the levers K to engage said disk with greater or lesser force when rocked on their pivots by the cam to engage the same.

In the construction shown in Fig. 5 the hub D' is extended and its outer end screw-threaded to receive a plain collar N, and sleeved on the hub between said collar and the disk G is a spring O, which normally exerts a force to firmly press the disks into frictional contact, and a hub P on the disk is provided with a groove for the attachment of an operating-lever to hold said friction-disk away from the plates against the action of said spring to allow the plates to run free.

When the cam member L is moved away from the clutch, thus allowing the springs K² to turn the levers K on their pivots and move their ends out of contact with the disk G, the springs I will operate to spread the plates apart and allow the plates F to turn independently of the plates H, and therefore when the driving-shaft A is rotated, together with the yoke D, which is secured thereto, the plates H will be turned freely by the engagement of the yoke with the notches in said plates, and no motion will be transmitted to the shaft B; but when the cam member is moved inward, thus forcing the outer ends of the levers outward, their inner ends will force the disks and plates toward the yoke and the plates H will be gripped between the plates F, so that the motion of the driving-shaft will be transmitted through the yoke, plates H, plates F, and feathers F' to the driven shaft B. This arrangement of plates gives a multiplied frictional surface in a small space, and by filling the openings in the plates H with frictional material their holding power is greatly increased, this insuring the positive and prompt action of the clutch. The arrangement of the plates and facing-disks also permits the use of the springs I, which immediately upon the release of the levers K by the cam member spread the disks apart, and thus insure the prompt "release" of the clutch, and the form and construction of parts is such as to make a simple and cheap device.

Having thus fully described my invention, what I claim is—

1. In a clutch, the combination with a driving and a driven shaft arranged in axial alinement with their ends abutting, a facing-disk having an axial sleeve secured to the end of one shaft and forming a socket to receive the end of the opposite shaft, a series of discous plates mounted on said sleeve at one side of said disk, a longitudinally-movable facing-disk at the other side of said plates, a feather secured to the sleeve and engaging notches in the plates and movable disk, a yoke secured to the shaft opposite that to which the sleeve is secured and having outwardly-extending arms provided with lateral ends extending longitudinally over said plates and disks, a second series of discous plates mounted on the sleeve between the first plates and disks and free to turn thereon and provided with notches in their peripheries to engage the ends of the yoke, flat springs secured to one face of each of the plates of the second series outside the peripheries of the first series and each engaging the adjacent plate of the series at its ends to force said plates apart, and means for moving the plates of one series into frictional contact with those of the other against the action of said springs.

2. In a clutch, the combination with a driving and a driven shaft, arranged in axial alinement with their ends abutting, a sleeve keyed to one end of the driven shaft and forming a socket to receive the end of the driving-shaft, a facing-disk integral with said sleeve, a series of discous plates on the sleeve at one side of the disk, a movable facing-disk on the sleeve at the other side of said plates, feathers secured to the sleeve and engaging notches in the plates and movable disk, a second series of discous plates of a greater diameter than the first series interposed between the same and having notches in their peripheries, a yoke secured to the driving-shaft and having outwardly-extending arms provided with ends extending longitudinally of the shaft to engage the notches in said plates, a strip secured to the end of each arm to hold the plates from being disengaged therefrom, flat springs secured to each of the plates of the second series near their peripheries outside of the peripheries of the plates of the first series and each bearing against the adjacent plate in the second series, an internally-screw-threaded collar screwed upon the end of the sleeve and provided with outwardly-extending ears, levers pivoted intermediate their ends between said ears with their ends in engagement with the movable facing-disk, and a clutch member movable longitudinally on the driven shaft to engage the opposite ends of said levers and force the same outward.

In testimony whereof I affix my signature in presence of two witnesses.

JONATHAN D. MAXWELL.

Witnesses:
 OTTO F. BARTHEL,
 THOMAS G. LONGSTAFF.